Patented Jan. 31, 1933

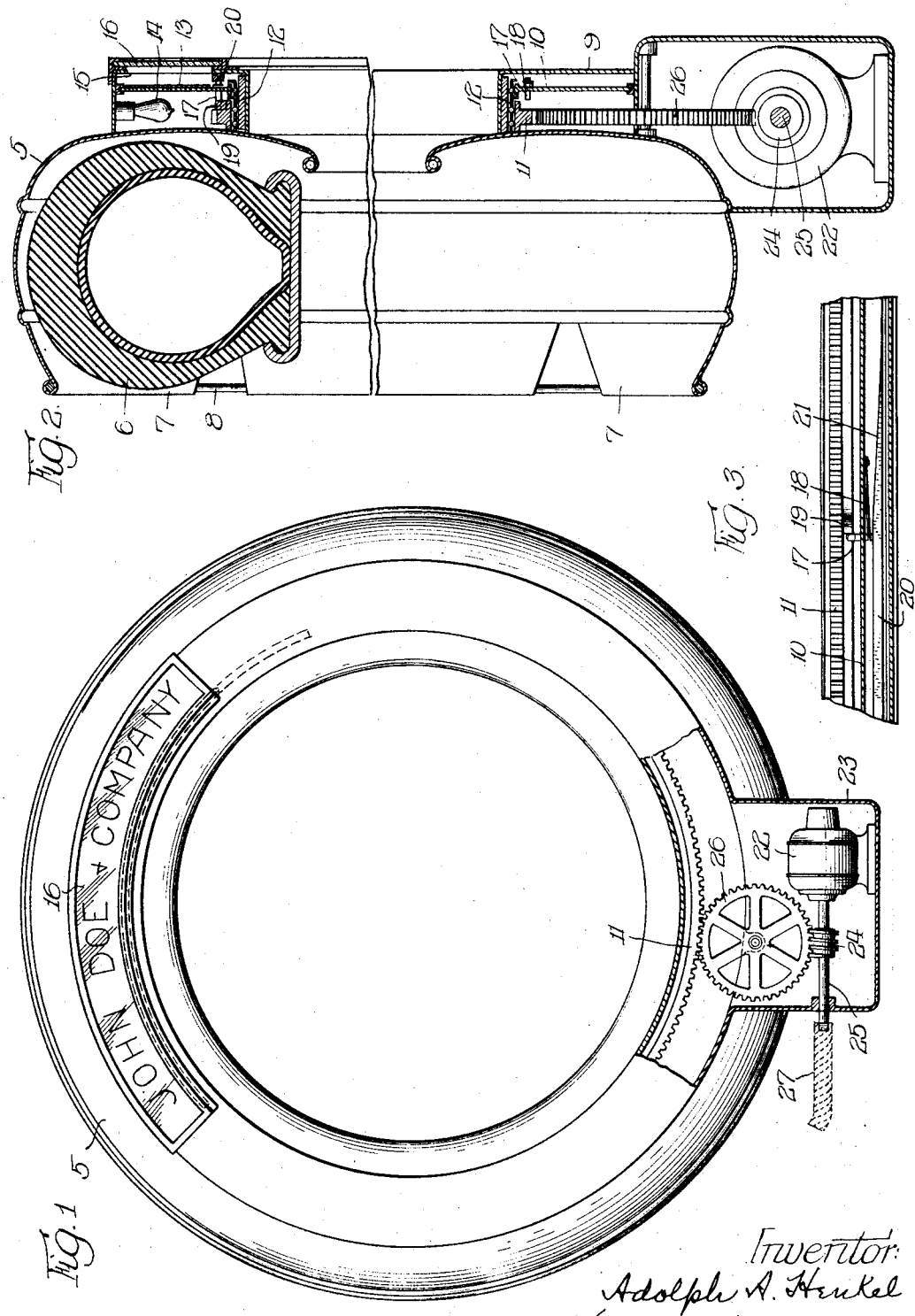

1,896,030

UNITED STATES PATENT OFFICE

ADOLPH A. HENKEL, OF RAVINIA, ILLINOIS, ASSIGNOR TO KENT W. WONNELL, OF RAVINIA, ILLINOIS

ADVERTISING DISPLAY SIGN

Application filed September 10, 1931. Serial No. 562,019.

This invention relates in general to an advertising sign and has more particular reference to an illuminated sign adapted to be carried by a rear spare tire of an automobile, although it may be of more general use wherever applicable.

One of the principal objects of the invention is in the provision of an intermittent sign illuminated from within or from the head lights of an automobile following the one which carries the sign.

A further object of the invention is in the provision of improved simple means for making a sign of this kind intermittent in operation.

A further object of the invention is in the provision of driving means which may be operated continuously or may be dependent upon the movement of the vehicle in which the device is located.

A further object of the invention is in the provision of a sign which is carried by a spare tire cover.

Other objects of the invention will appear hereinafter, the preferred construction being shown in the accompanying drawing.

In the drawing, Figure 1 is an elevation with parts in section, of a display sign constructed in accordance with the principles of this invention;

Figure 2 is a sectional view of the sign; and

Figure 3 is a sectional detail showing a portion of the intermittent mechanism.

It is customary to carry a spare tire at the rear of many automobiles and to provide this tire with a cover which protects and substantially encloses it. These protecting covers may be made of fabric or light sheet metal adapted to be quickly attached and detached from the tire and presenting a rear surface clearly visible from the rear, and particularly from a machine following that on which the sign is carried so that if the sign is movable or intermittent in operation it will be clearly visible in the daylight and at night it is illuminated by the headlights of the following vehicle.

Referring now more particularly to the drawing, a tire cover 5 formed of sheet material has an inner edge adapted to be applied over a tire 6 and resiliently held in place thereon by means of split tongues 7 and a resilient or wire clamping member 8 so that the cover may be quickly applied and removed.

At the outer side of the cover and preferably adjacent the outer periphery thereof is a casing 9 for enclosing a circular sign member 10 and a circular gear 11 which are mounted side by side for free rotation upon roller or ball bearings 12. The sign member 10 is provided with reflecting letters or characters 13 or with cut-out portions illuminated from the rear side by one or more electric lamps 14 so that the letters will be clearly visible by day or by night and even when the vehicle which carries the sign is at rest.

A portion of the casing is provided with a window opening 15 covered by a glass 16 or other transparent means, so that a portion only of the sign is visible at one time.

In order to rotate the sign member 10 it is provided with a number of spaced projections or stops 17 each preferably extending through the member 10 and provided at one side with a spring 18 which tends to draw the stop through to that side of the member. At the other side of the member the gear 11 has a projection 19 to engage any one of the stops 17 when it extends sufficiently through the member 10 to be in the path thereof. In order to move the stops 17 into the path of the projection 19, a cam 20 is secured to the casing 9 adjacent the opening 15 and has an inclined portion 21 adapted to engage the spring and of each of the stops 17 in succession and to move them through the member 10 as it is rotated until it is moved into the path of the projection 19 which engages it as the gear 11 is rotated and carries the member 10 a portion of a rotation, depending upon the length of the cam 20. As soon as the projection 17 reaches the end of the cam 20, the spring 18 pulls it through the member 10 and out of the path of the projection 19, and the gear 11 rotates free from the member 10. This cam 20 is of such a length that when one projection 17 slides off of the cam, the next succeeding projection 17 is already moved up the incline 21 in position to be engaged by the projection 19 when the gear 11 is sufficiently rotated. This produces intermittent operation of the sign member 10 so that the exposed part visible through the opening 15 may carry successive words or a succession of phrases for advertising or other purposes.

In order to rotate the gear member 11 a small electric motor 22 may be mounted in an extension 23 of the casing 9 having a worm gear 24 mounted upon its shaft 25 and engaging a gear wheel 26 which meshes with the gear 11. If desired, a flexible or other driving connection 27 may be provided for also engaging an exposed end of the shaft 25. This flexible driving connection may be connected in any well known way to the wheel or shaft of an automobile and may be provided with clutch means (not shown) for connecting and disconnecting it in any well known manner.

If desired, the stops 17 may be omitted, making the operation of the sign member 10 continuous.

With this construction it is obvious that the sign will be visible and will attract attention either when the vehicle is in motion or when it is standing still. By having letters illuminated from the rear and also by having letters which are made visible by the light of another automobile shining upon them, the sign will be attractive both to occupants of a following vehicle and to other observers.

I claim:

1. A rotatable ring sign member, a casing therefor having a segmental curved display opening therein, means to rotate the member, and means including a spring pressed stop and a cam for controlling it to intermittently connect the member and said rotating means.

2. An intermittent sign comprising a rotatable ring member and continuous rotating means therefor, a ring shaped casing for the member having a curved display opening therein, a cam at one side of the member, a stop carried by the member and moved by the cam into the path of said means, the stop moving out of the path of the means when it slides from the cam.

3. In an intermittent sign, a rotatable ring member, rotating means therefor, a cam, a stop carried by the member and moved by the cam into the path of the means, the cam having an inclined portion for moving the stop into the path of the means, and a ring shaped casing for the member with an opening at one side through which the member is visible.

4. A display sign comprising a casing having a curved sectional opening therein, a rotatable ring sign member in the path of the opening, means to rotate the member, and intermittent operating means comprising a cam and a spring pressed stop operated thereby to connect the display sign and the member at intervals, allowing a portion of the sign to remain at rest and visible through the opening.

5. A display sign comprising a circular casing having a curved sight opening, and an extension at one portion thereof, a ring sign member and a gear rotatable in the casing, means periodically to connect the sign member and the gear comprising a stop on the sign member and a projection on the gear, a motor rotatable in the casing extension and a driving connection between the motor and the gear.

6. The combination with a tire cover having a casing at one side, of a sign member and a driving gear rotatable in the casing, means to drive the gear continuously and means for intermittently connecting the gear and the sign for periodically moving the sign member.

7. The combination with a removable tire cover for a rear spare automobile tire, of a circular casing having a curved display opening therein, a ring sign member and continuous driving means rotatable in the casing, luminous letters carried by the sign member and means for illuminating the sign member from the inside of the casing so that the letters thereof are visible from the outside of the casing both when a light shines upon them from the outside and when they are illuminating only from the inside of the casing.

8. The combination with a movable rear tire cover for an automobile, having a casing at the rear side with a sectional opening therein, a display sign and a driving gear separately rotatable in the casing, means for connecting the sign member and the gear intermittently and driving means for the gear comprising a motor having a projecting shaft, and means also attachable to the shaft for driving the sign member from a moving part of a vehicle to which the tire cover is applied.

9. A display sign having a casing in the shape of a ring and with a curved opening therein, a ring sign member rotatable therein and visible through the opening, continuous driving means, and means for intermittently connecting the driving means and the sign member for periodically moving the sign member to display different portions thereof through the opening.

ADOLPH A. HENKEL.